United States Patent [19]

Eiken

[11] Patent Number: 5,621,788
[45] Date of Patent: Apr. 15, 1997

[54] ELECTRICAL WALLBOX FOR TELEPHONE DEVICES

[76] Inventor: Marvin L. Eiken, 9213 Hwy. 50 W., Centertown, Mo. 65023

[21] Appl. No.: 513,005

[22] Filed: Aug. 9, 1995

[51] Int. Cl.⁶ .......................... H04M 17/00; H04M 1/00; H04M 9/00
[52] U.S. Cl. .................. 379/147; 379/148; 379/428; 379/435; 379/437; 379/451
[58] Field of Search .................... 379/143, 147, 379/148, 428, 435, 437, 438, 440, 446, 450, 451, 454

[56] References Cited

U.S. PATENT DOCUMENTS

| | | | |
|---|---|---|---|
| 3,305,284 | 2/1967 | Dusterhoft | 312/242 |
| 3,511,942 | 5/1970 | Quigley | 379/454 |
| 3,840,711 | 10/1974 | Tucker | 179/146 |
| 3,963,883 | 6/1976 | Kulka | 179/179 |
| 4,056,696 | 1/1977 | Meyerle et al. | 179/100 |
| 4,568,801 | 2/1986 | Gates | 379/454 |
| 4,731,809 | 3/1988 | Crane et al. | 379/27 |
| 4,731,836 | 3/1988 | Awakowicz | 379/428 |
| 5,121,863 | 6/1992 | Kotialo | 379/446 |
| 5,305,381 | 4/1994 | Wang | 379/454 |
| 5,349,134 | 9/1994 | Russell | 174/48 |
| 5,402,487 | 3/1995 | Swett | 379/435 |

Primary Examiner—Curtis Kuntz
Assistant Examiner—Vijay Shankar
Attorney, Agent, or Firm—Richard J. Grundstrom

[57] ABSTRACT

A recessed wall unit to accommodate a telephone, cordless telephone and/or an answering machine. The box for telephone devices of this invention consists of a generally rectangular box with an electrical outlet and a telephone jack internally mounted within the box. The outlet is supplied electrical power by typical wiring coming into the box through an inlet. Telephone wires are also feed to the internally mounted telephone jack through another inlet. A cover plate attaches to the front of the box to completely close and cover the front opening of the box. A telephone, cordless telephone or answering machine can be mounted on the front of the cover plate. The power supply for the telephone device can be plugged into the internally mounted outlet. The telephone device is connected to the internally mounted telephone jack. The power supply, outlet, power cord to the telephone device, telephone jack and all wiring is hidden from view behind the cover plate and within the box. The box can be mounted within a wall cavity and the cover plate mounts flush with the wall surface to provide an aesthetical appearance.

11 Claims, 6 Drawing Sheets

ELECTRICAL WALLBOX FOR TELEPHONE DEVICES

BACKGROUND OF THE INVENTION

The present invention relates to a box for telephone devices and more particularly to a wall mounted telephone box containing an electrical outlet, hidden storage space for a cordless telephone power supply, a telephone mounting means and telephone connection within the box.

Today's modern telephones and particularly cordless telephone require an external power supply. The power supply generally plugs into a nearby standard duplex outlet. The outlet is, for the most part, wall mounted and has room to receive two plugs. The power supply is usually a small rectangular box measuring a couple inches per side. A power cord from the power supply then extends across the wall to supply low voltage to the telephone. Commonly the power cord is hidden as much as possible, but generally, the power supply and power cord are within view. It is often unsightly and not aesthetically pleasing.

Electrical outlets and telephone jacks are common. This invention includes a unique box that incorporates a common electrical outlet and a common telephone jack to overcome the unsightly appearance and inconvenience of using a standard wall outlet.

Accordingly, it is an object of the present invention to provide a box for telephone device that provides a convenient means of combining an electrical outlet and a telephone jack in a single box for a wall mounted telephone, cordless telephone or answering machine.

Another object of the present invention is to provide a box for telephone device that completely conceals the telephone jack, electric outlet, power supply and the power cord from the power supply within the box and completely out of view.

A further object of the present invention is to provide a box for telephone device that is adapted to substantially improve the aesthetical appearance of a wall mounted telephone, cordless telephone or answering machine.

Still another object of the present invention is to provide a box for telephone device that may be adapted to fit the decor of any room in which the box for telephone device is installed.

Still a further object of the present invention is to provide a box for telephone device that is simple to manufacture using common materials and supplies. The box for telephone device of this invention is characterized by the use of a common outlet and telephone jack contained within a unique electrical box having a cover with a telephone mounting means.

Another object of the present invention is to provide a box for telephone device that can be recessed mounted within a wall cavity of new construction or within existing structures.

SUMMARY OF THE INVENTION

To accomplish the foregoing and other objects of this invention there is provided a box for telephone device and more particularly to a telephone wall box having a telephone jack and an outlet for plugging in the power supply of a cordless telephone or answering machine.

The box for telephone device of this invention includes a recessed wall unit that accommodates a telephone, cordless telephone and/or an answering machine. The unit basically consists of a rectangular electrical box that can be installed in new or old construction. The box has a telephone jack and a 110 volt outlet on the inside. There is sufficient room inside the box to plug the power supply into the outlet and completely hide the power source from view. A cover plate covers the box opening and mounts flush with the wall. The cover plate has a standard telephone mounting means to receive most wall telephones and/or answering machine. A slot in the cover allows the telephone cord and power cord to extend from inside the box to the telephone.

These and other objects and features of the present invention will be better understood and appreciated from the following detailed description of the main embodiment thereof, selected for purposes of illustration and shown in the accompanying drawings.

DETAILED DESCRIPTION

Figure 1:
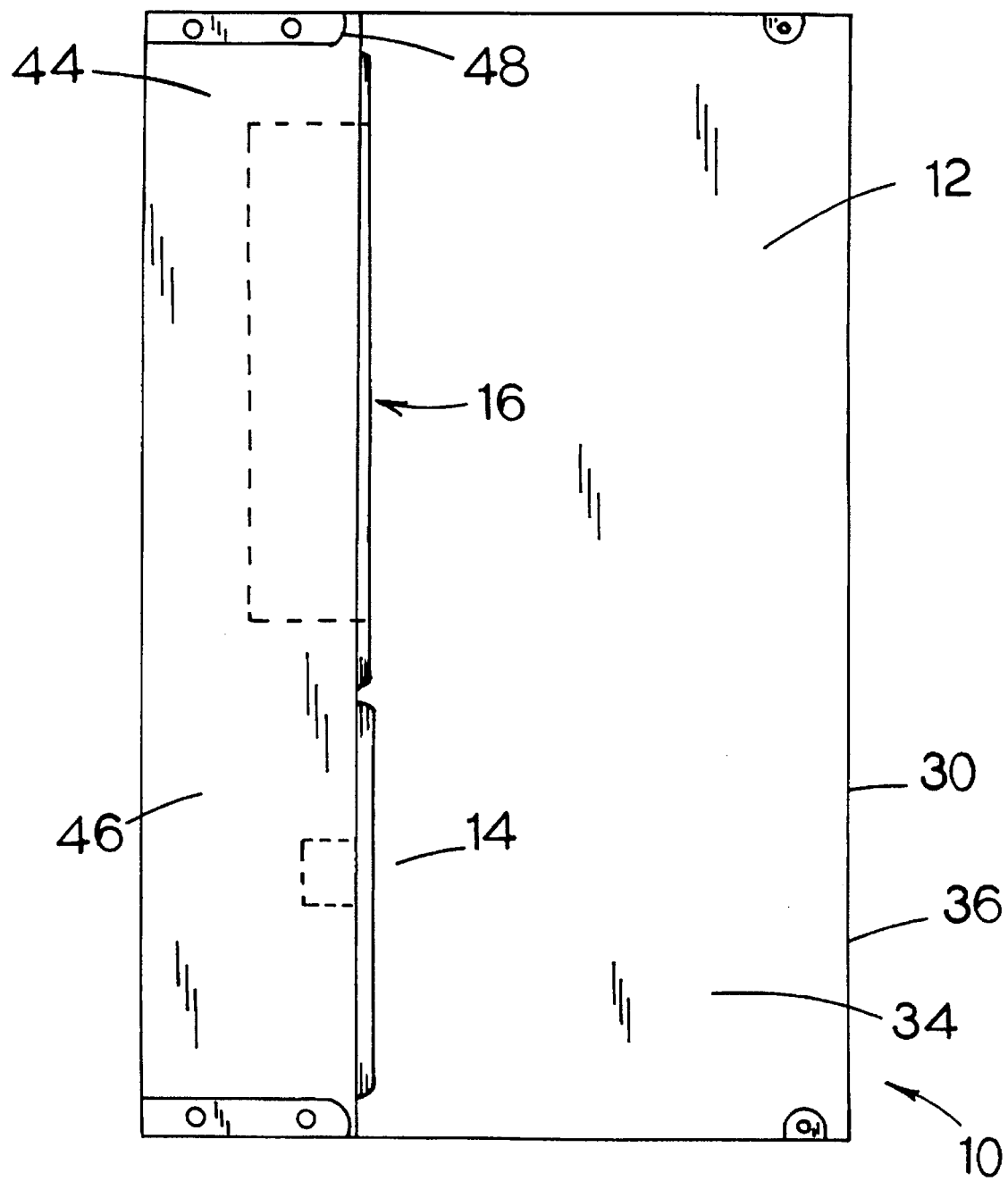
FIG. 1 is a front view of the interior of the box for telephone device.
Figure 2:
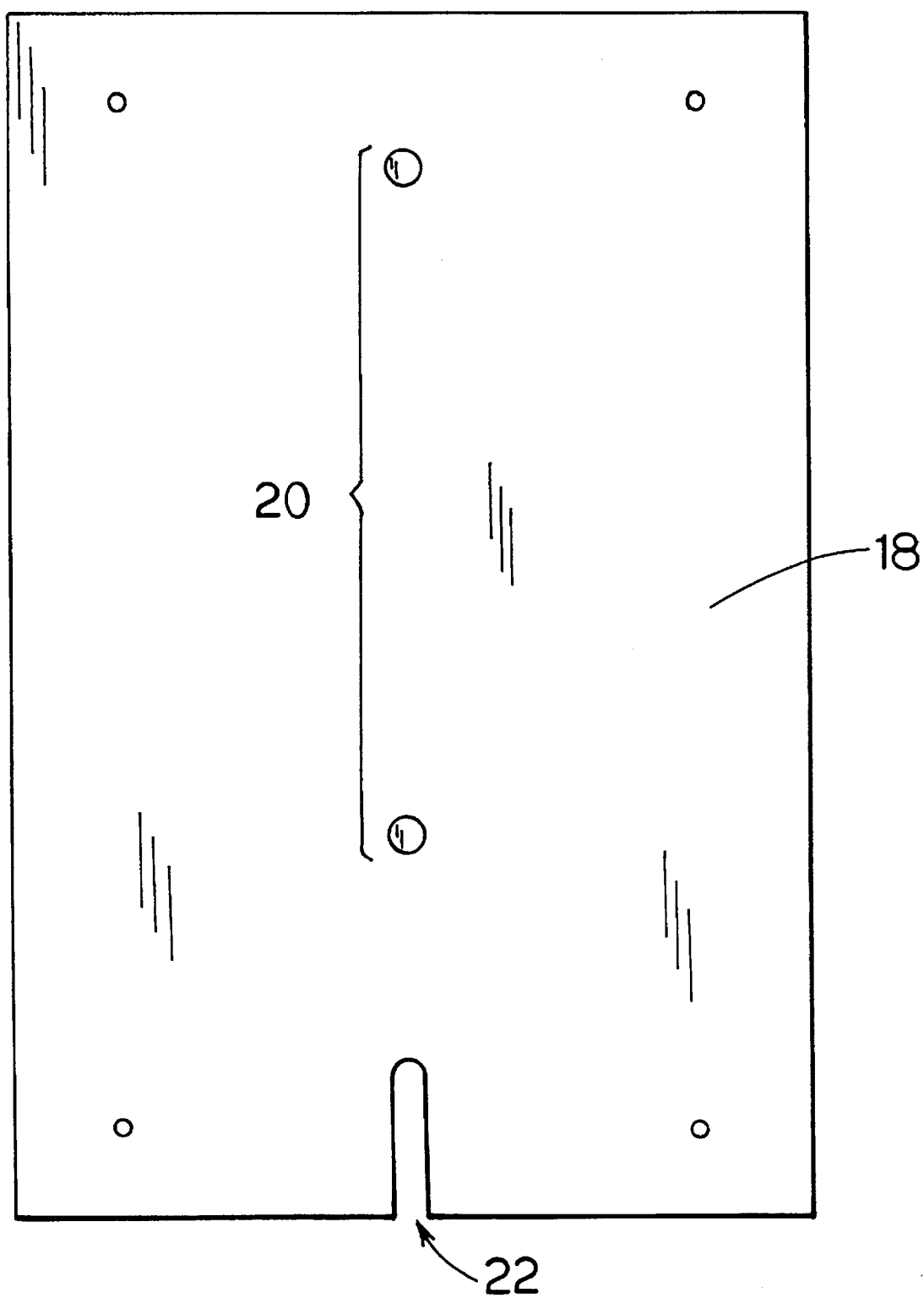
FIG. 2 is a front view of the cover plate for the box for telephone device.

Referring now to the drawings in general there is shown the preferred embodiment for the box for telephone device 10 of this invention. Basically, the box for telephone device 10 is a recessed wall unit designed to accommodate a telephone, cordless telephone and/or an answering machine, hereinafter called a telephone device 24. The box for telephone device 10 basically consists of a rectangular electrical box 12 that can be installed in new or old construction. The box 12 has a telephone jack 14 and a 110 volt outlet 16 contained on the inside. There is sufficient room inside the box 12 to plug the power supply 26 for the telephone device 24 into the outlet 16. The power supply 26 is completely hidden from view and yet it is conveniently located near the telephone device 24. A cover plate 18 covers the front opening of box 12 and mounts flush with the wall. The cover plate 18 has a standard telephone mounting means 20 to receive most wall mounted telephone devices 24. A slot 22 or opening in the cover plate 18 allows the telephone cord and power cord to extend from inside the box 12 to the telephone device 24.

The preferred embodiment and the best mode contemplated of the box for telephone device 10 of the present invention are herein described. However, it should be understood that the best mode for carrying out the invention hereinafter described is offered by way of illustration and not by the way of limitation. It is intended that the scope of the invention include all modifications that incorporate its principal design features.

Figure 3:
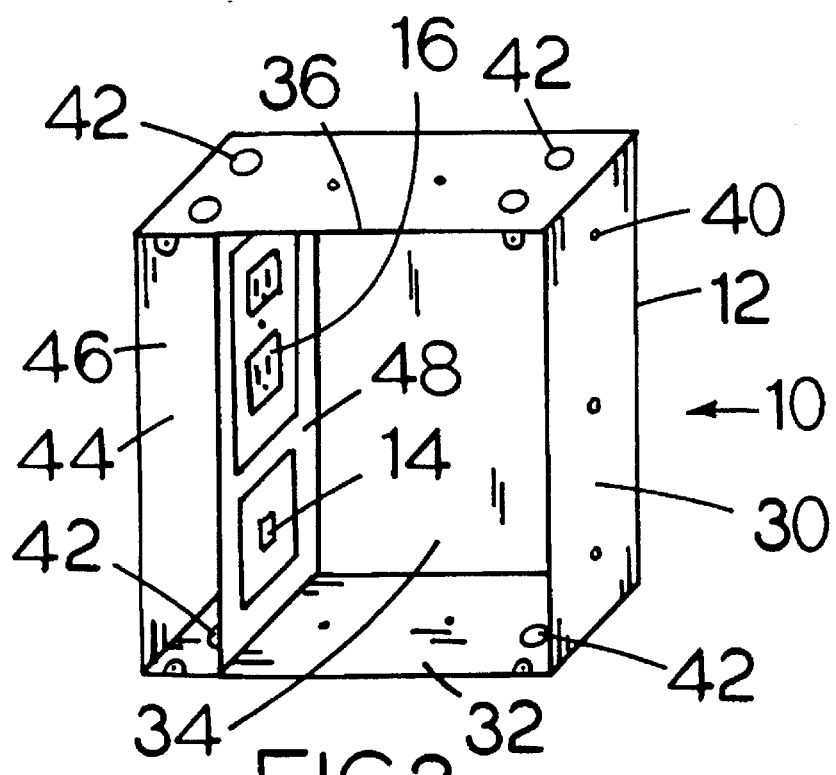
FIG. 3 is an isometric view of the interior of the box for telephone device showing the outlet and telephone jack installed on the mounting piece.
Figure 4:
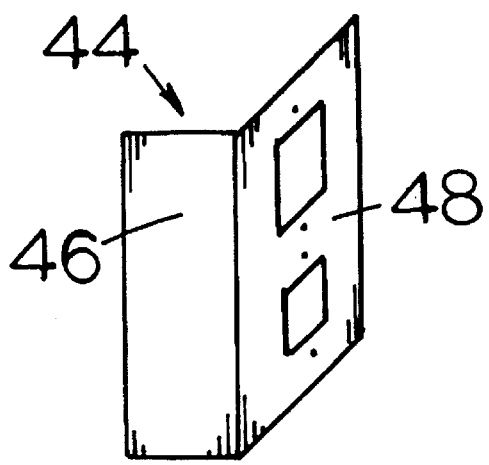
FIG. 4 is an isometric view of the mounting piece showing the cut out areas for the outlet and telephone jack.
Figure 5:
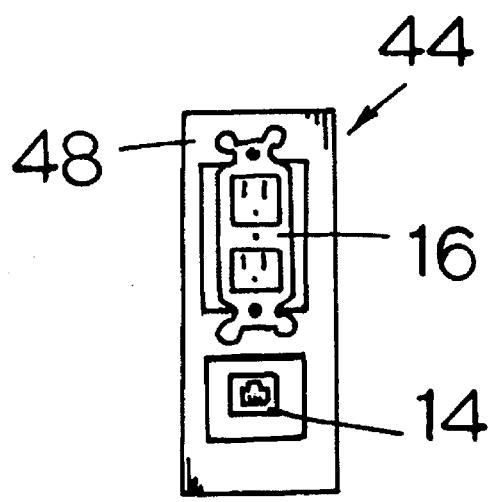
FIG. 5 is a view of the inside surface of the mounting piece showing the outlet and telephone jack.
Figure 6:
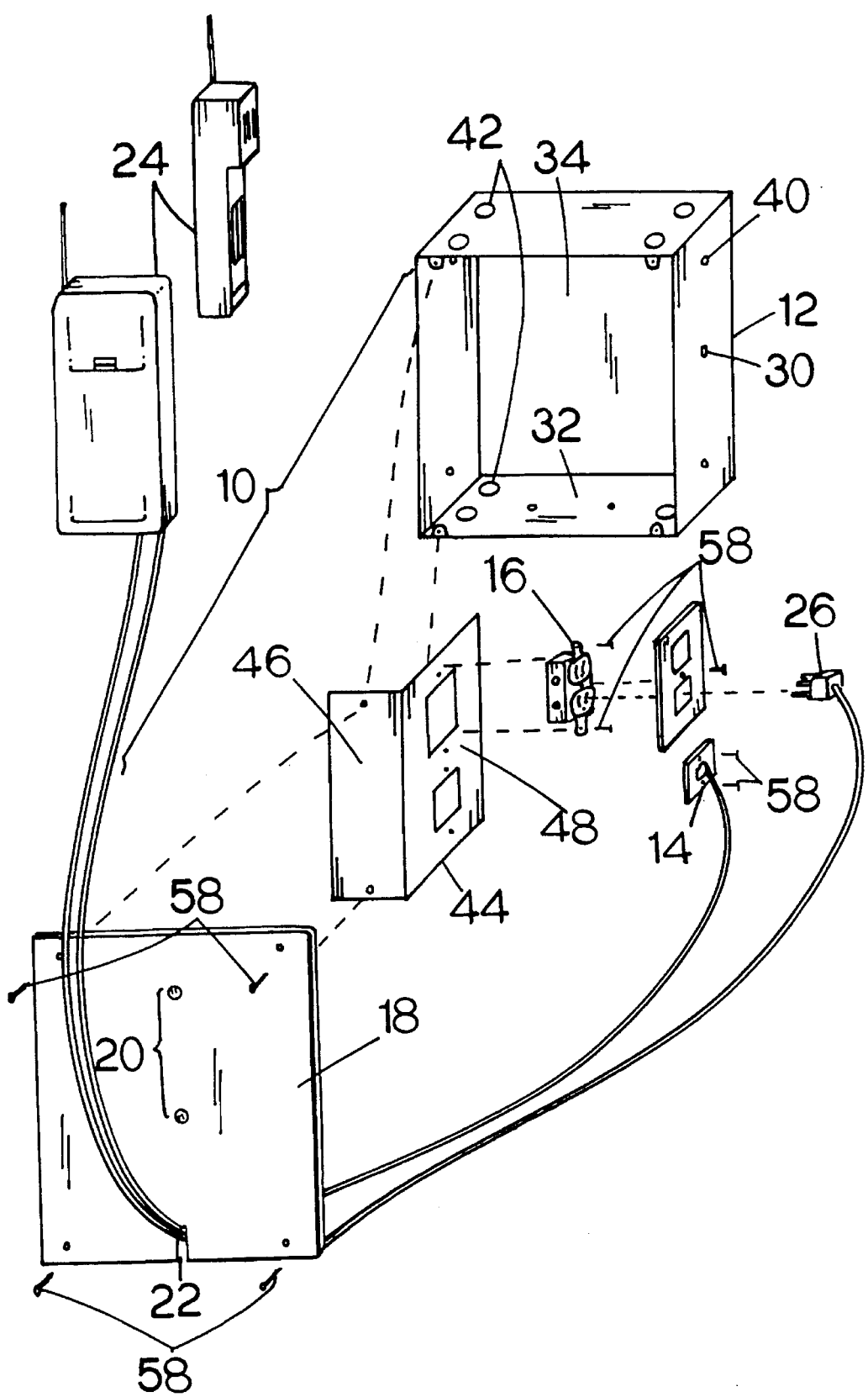
FIG. 6 is an exploded view of the box for telephone device.

The electrical box 12 is generally rectangular shaped and can be manufactured from plastic or metal. The box 12 is defined by the perimeter walls 30 and back 34. This also defines the interior area of the box 12. The box 12, in the preferred embodiment, is made from plastic and in the best mode contemplated has dimensions of approximately 5 inches wide, 8 inches tall and 3 inches deep. The dimensions can be varied without departing from the scope and spirit of the inventive concepts disclosed herein. FIGS. 1, 3 and 6.

Figure 8:
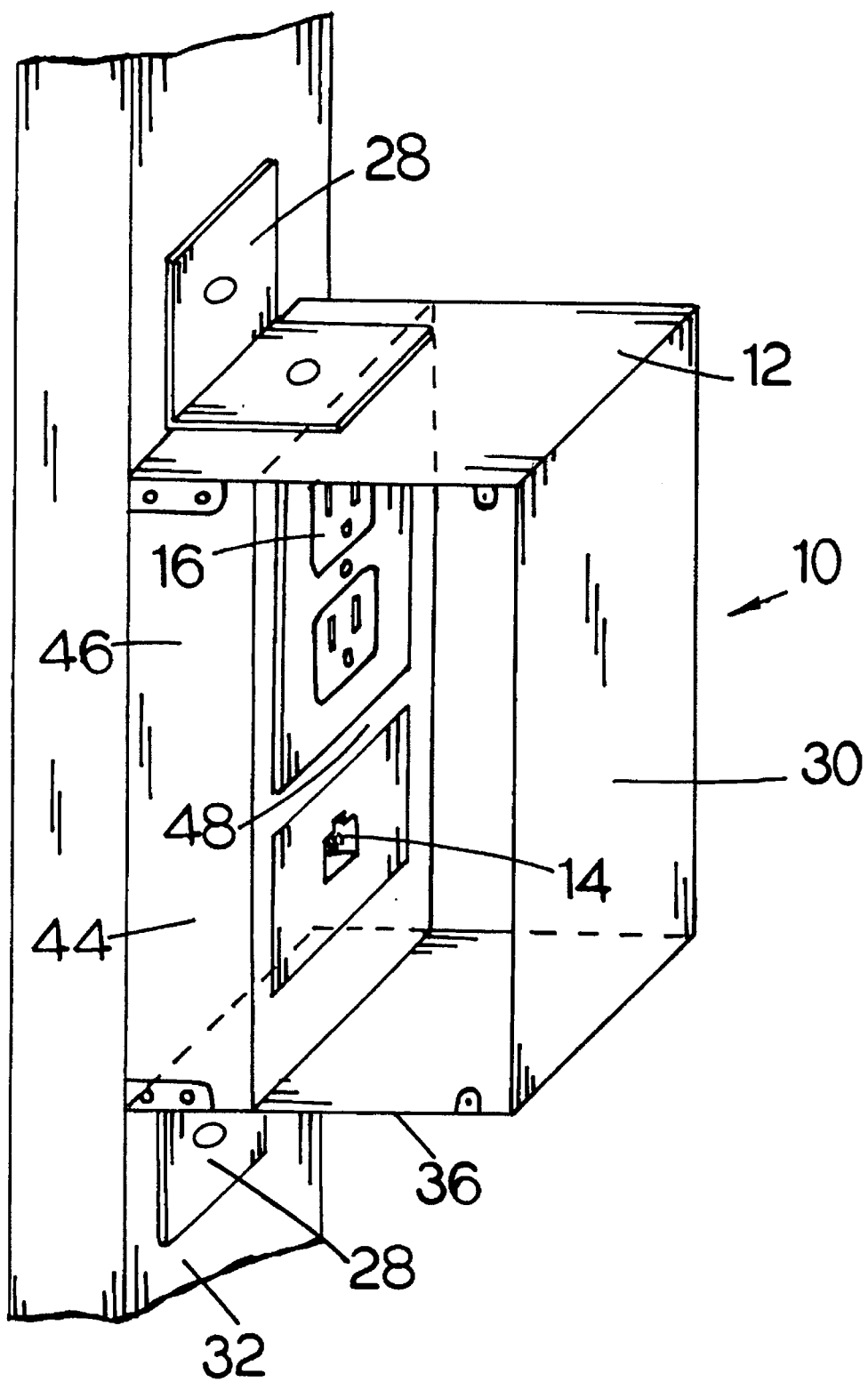
FIG. 8 is an isometric view showing the box for telephone device attached to a wall stud with mounting brackets.

The box 12 is typically designed to be recessed mounted on a wall. The body of the box 12 would extend into the wall cavity through a hole in the sheetrock or other wall surface. The front edge 36 of the perimeter walls 30 would be mounted flush with the wall surface. Brackets 28 are provided for attaching the box 12 to wall studs 32 or wall supporting structure in new construction. The brackets 28 are attachable to the exterior surfaces of the perimeter walls 30. FIG. 8. Additionally, a plurality of holes 40 may be provided through the side, top and bottom perimeter walls 30 as an additional means of attaching the box to the wall's supporting structure and for attachment of brackets 28.

Figure 7:
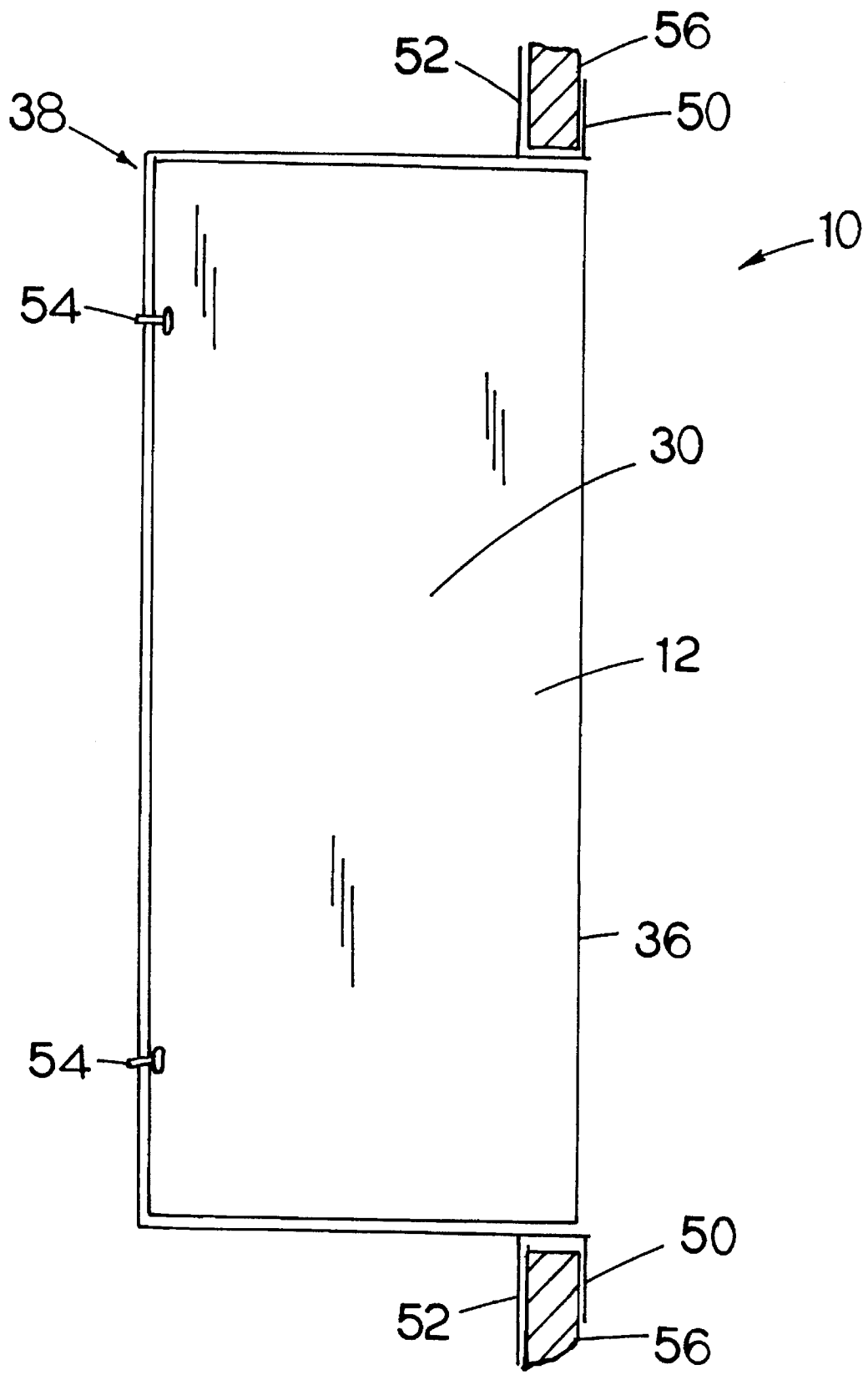
FIG. 7 is a partial side view showing the flange attached to the front edge.

A flange 38 is also provided for installation in old or existing walls. FIG. 7. The flange 38 fits within an opening cut in the wall of an existing wall. The flange 38, in the preferred embodiment, has front lips 50 and back lips 52, that are located on the top and bottom of the flange 38. The lips 50 and 52 fit over the top and bottom of the wall board 56 opening. The flange 38 has a generally rectangular shape that fits within the wall board 56 opening and receives the box 12. The lips 50 and 52 hold the flange 38 in a fixed position in the opening. The box 12 is secured to the flange 38 by screws 54 or by other fastening means. Once the box 12 is installed within the flange 38, the box 12 is firmly mounted and secured in a recessed fixed position on the wall. The flange 38 prevents the box from falling into the wall cavity and provides a means of attaching the box 12 to the wall.

Other attachment means could also be used for securing the box 12 in a wall without departing from the inventive concepts herein disclosed.

A plurality of electrical inlets 42 are included along the perimeter walls 30. The inlets 42 provide a means for bringing electrical and telephone wires into the interior area of the box 12. The inlets 42 will typically have knockouts to keep the unused inlets 42 covered. Only the knockouts of the inlets 42 to be used will be removed. The inlets 42 are appropriately located to provide convenience of installation of the outlet 16 and telephone jack 14 within the box 12 and taking into consideration the position of the electrical and telephone wires coming into the box 12.

A telephone jack 14 is mounted within the interior area of the box 12. The telephone jack 14, in the preferred embodiment, is a common type of modular telephone jack typically found and used for most modern telephone devices. These types of jacks are available in a wide variety of different styles for attachment. A variety of jack that would be typically installed in an outlet box is used in the preferred embodiment of this invention. However, other telephone jack styles or designs could also be installed for a particular application or as needed.

The outlet 16 is typically a standard duplex electrical outlet for 110 AC volts. This is similar to the most common type of outlet used in homes throughout the United States. However, other types of outlets could also be used as needed. The electrical outlet 16 is mounted completely within the box 12. The outlet 16 must be properly situated within the box to ensure sufficient space to receive a power supply 26 and such that the power supply is completely contained within the interior area of box 12.

A mounting piece 44 is typically provided for attaching the outlet 16 and telephone jack 14 within the interior of the box 12. The mounting piece 44 basically defines an interior electrical box for rigidly attaching the outlet 16 and telephone jack 14 in a fixed position. The mounting piece 44 also covers the electrical connections of electrical power to the outlet 16 and telephone jack 14 for safety and aesthetical appearance.

The mounting piece 44 is typically a single strip of plastic or metal having a 90 degree corner to define two perpendicular surfaces. The two surfaces are referred to as front surface 46 and inside surface 48. The mounting piece has a length to fit the height of the interior of box 12. The width of the front surface is approximately 1½ inches. The width has to be sufficient to enclose the back of outlet 16 and to leave sufficient space for the electrical wiring to the outlet 16 and telephone jack 14 . The front surface 46 generally faces outward from the box 12 and is what you would see when looking straight into the box 12.

The inside surface 48 is perpendicular to the back 34 of the box 12. The width of the inside surface is a little less then the depth of the box 12. In the preferred embodiment the depth is 3 inches. Therefore, the width of the inside surface will be a little less then 3 inches. The inside surface 48 will typically have areas cutout for receiving and attaching the outlet 16 and telephone jack 14. The outlet 16 and telephone jack 14 are rigidly attached in the usual way with screws.

After the outlet 16 is connected to the electrical power and the telephone jack 14 is connected to the telephone wires, the mounting piece 44 is attached to the interior of the box 12. Typical outlet and telephone coverplates may also be used to resemble the standard outlet and telephone jack.

A cover plate 18 is provided to cover and close box 12. The cover plate 18 attaches to the front edge 36 of box 12, using screws in the preferred embodiment. The cover plate 18, typically is larger than the outside dimensions of box 12. In the preferred embodiment, the cover plate 12 will be made from plastic, 6 inches wide and 9 inches tall. The thickness can range from thin to thick depending on the particular material being used. Typically, the thickness will range between ⅛ and ¼ inch thick.

The cover plate 18 when attached to the box 12 will be mounted flush with the wall surface. The cover plate 18 completely covers and closes the box 12. The cover plate 18 can be made in various styles and with decorative matter for matching the decor of the building in which the box for telephone device 10 is installed. The box for telephone device 10 will typically be supplied with a plastic white, ivory or brown cover plate 18 that matches the most common electrical cover plates being used today.

A telephone mounting means 20 attaches a telephone device 24 to the front of cover plate 18. The telephone mounting means 20 comprises a standard telephone mounting device that is nothing more then two posts with heads centered on cover plate 18 and separated by a specific distance. The telephone device 24 hangs on the post with the heads securing the telephone device 24. The telephone device mounting means 20 receives either a telephone, cordless telephone or an answering machine.

A slot or opening 22 is provided through the cover plate 18. The opening 22 allows the telephone cord from the telephone device 24 to be connected to the telephone jack 14 within the box 12 and for a power cord from the power supply 26 plugged into the outlet 16 within the box 12 to be connected to the telephone device 24.

When properly installed the telephone cord, power cord, power supply 26, outlet 16 and telephone jack 14 are completely hidden from view behind the cover plate 18 and within the interior area of box 12. The view will be the cover plate 18 and telephone device 24 attached to the front of the cover plate 18. Without this invention, the telephone would be hanging on a wall mounted telephone jack. The power supply would be plugged into a nearby outlet with the power cord extending across the wall surface. In some instances an extension cord is also used to reach an outlet. The power supply, power cord to the telephone and the extension cord are all in plan view and often in the way.

The present invention provides a means of improving the appearance and convenience of attaching a telephone device and making an aesthetical appearance.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A box for attaching a telephone device to a wall comprising:
   a generally rectangular shaped box that can be recessed mounted on a wall, said generally rectangular shaped box having an interior area and a front edge that is mounted flush with a wall surface;
   a plurality of electrical inlets along perimeter wall surfaces and back side of said generally rectangular shaped box, said electrical inlets for bringing electrical power and telephone wires into said interior area of said generally rectangular shaped box;
   an outlet mounted within said generally rectangular shaped box, said outlet situated for receipt of a power supply, said electrical power terminating at said outlet, said outlet and power supply fitting completely within said interior area of said generally rectangular shaped box;
   a telephone jack mounted within said generally rectangular shaped box, said telephone wires terminating at said telephone jack;
   a cover plate attachable to the front of said generally rectangular shaped box and mounted flush to the wall surface, said cover plate completely covering and closing said generally rectangular shaped box, said cover plate having an opening for passage of a telephone cord and a power cord through said cover plate; and
   a telephone mounting means attached to a front surface of said cover plate, said telephone mounting means for attaching a telephone device, a telephone cord from said telephone device extends through said opening and attaches to said telephone jack within said interior area of said generally rectangular shaped box, a power cord extending from said power supply within said interior area passes through said opening and attaches to the telephone device for supplying power to the telephone device; said telephone cord, power cord, power supply, outlet and telephone jack being completely hidden from view behind said cover plate and within said interior area of said generally rectangular shaped box.

2. The box as set forth in claim 1 further comprising brackets attachable to exterior perimeter surfaces of said generally rectangular shaped box for attaching said box to a wall or wall supporting structure.

3. The box as set forth in claim 1 further comprising a flange, said flange having lips to engage edges of an opening cut in an existing wall for securing said generally rectangular shaped box in a fixed and recessed position in an existing wall.

4. The box as set forth in claim 1 further comprising a plurality of holes through side, top and bottom perimeter walls for attaching said generally rectangular shaped box to a wall supporting structure.

5. The box as set forth in claim 1 further comprising an inside mounting piece attached within said interior area of said generally rectangular shaped box, said inside mounting piece defining an interior electrical box for rigidly attaching said outlet in a fixed position and covering the electrical connection of said electrical power to said outlet and for rigid attachment of said telephone jack within said interior area of said generally rectangular shaped box.

6. The box as set forth in claim 1 in which said outlet is a standard duplex electrical outlet for 110 AC volts.

7. The box as set forth in claim 1 in which said cover plate further comprises decorative matter for matching the decor of the building in which said box is installed.

8. The box as set forth in claim 1 in which said telephone mounting means comprises a standard telephone mounting device.

9. The box as set forth in claim 1 in which said telephone device mounting means receives a telephone, cordless telephone or an answering machine that can be wall mounted and requires electrical power from a power supply that plugs into an outlet.

10. The box as set forth in claim 1 in which said opening in said cover plate comprises a slotted opening extending inward from an edge of said cover plate.

11. A box for telephone device comprising:
   a generally rectangular box defined by side, top and bottom perimeter walls and a back;
   an electrical outlet internally mounted within said generally rectangular box;
   a telephone jack internally mounted within said generally rectangular box;
   a plurality of inlets on said perimeter walls for incoming electrical power wiring terminating at said electrical outlet and telephone wires terminating at said telephone jack;
   a cover plate attachable to a front opening on said box, said cover plate completely closing and covering said front opening;
   a mounting means attached to a face of said cover plate for the attachment of a telephone device to said box; and
   an opening on said cover plate for passage of a telephone wire from the telephone device and a power cord from a power supply for the telephone device;
   the power supply being plugged into said electrical outlet within said box and the telephone wire being plugged into said telephone lack within said box; the power supply, said electrical outlet, said telephone jack, the telephone wires and the power cord being completely hidden from view behind said cover plate and contained within said box.

* * * * *